United States Patent
Beneker et al.

(10) Patent No.: US 8,113,588 B2
(45) Date of Patent: Feb. 14, 2012

(54) BASE FRAME OF A MOTOR VEHICLE SEAT HAVING TWO RAIL PAIRS, ROCKERS AND A SEAT SUPPORT

(75) Inventors: Wilfried Beneker, Leichlingen (DE); Burckhard Becker, Solingen (DE); Waldemar Luft, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 13/031,202

(22) Filed: Feb. 19, 2011

(65) Prior Publication Data
US 2011/0163585 A1 Jul. 7, 2011

Related U.S. Application Data

(63) Continuation of application No. PCT/EP2009/060421, filed on Aug. 12, 2009.

(30) Foreign Application Priority Data

Aug. 19, 2008 (DE) ...................... 10 2008 041 345.3

(51) Int. Cl.
*B60N 2/02* (2006.01)
(52) U.S. Cl. .................................................. 297/344.17
(58) Field of Classification Search ............. 297/344.15, 297/344.17, 330; 248/421
See application file for complete search history.

(56) References Cited

U.S. PATENT DOCUMENTS

| 3,765,720 | A | 10/1973 | Sakai |
| 5,622,406 | A | 4/1997 | Meschkat et al. |
| 6,273,507 | B1 * | 8/2001 | Downey .................... 297/344.15 |
| 6,361,109 | B1 * | 3/2002 | Tokarz et al. ............ 297/344.15 |
| 6,502,798 | B1 | 1/2003 | Frohnhaus |
| 6,957,796 | B2 * | 10/2005 | Hensley et al. ............... 248/421 |
| 7,413,252 | B2 * | 8/2008 | Kim et al. ................ 297/344.15 |
| 7,775,592 | B2 * | 8/2010 | Becker et al. ............ 297/344.17 |
| 2006/0260424 | A1 | 11/2006 | Becker |
| 2008/0179932 | A1 * | 7/2008 | Becker et al. ................. 297/367 |

FOREIGN PATENT DOCUMENTS

| DE | 10044851 A1 | 6/2002 |
| EP | 1190891 B1 | 3/2008 |

OTHER PUBLICATIONS

International Search Report of the International Searching Authority for International Application No. PCT/EP2009/060421, mailed Nov. 23, 2009.
International Preliminary Report on Patentability for International Application No. PCT/EP2009/060421, mailed Feb. 22, 2011.

* cited by examiner

*Primary Examiner* — Milton Nelson, Jr.
(74) *Attorney, Agent, or Firm* — McCarter & English, LLP

(57) ABSTRACT

The base frame of the motor vehicle seat comprises two rail pairs, two front rockers, two rear rockers and one seat support. The seat support has two side parts, a front cross member and a rear cross member. Each rail pair is hinged to a side part via a front rocker and a rear rocker. An adjustment device is provided for the height adjustment of the seat support. A rocker is connected to a transverse part. A support part is provided which is connected to the transverse part and comprises a hinge area for an adjustment part of the adjustment device and a contact area on the adjacent cross member.

17 Claims, 1 Drawing Sheet

US 8,113,588 B2

BASE FRAME OF A MOTOR VEHICLE SEAT HAVING TWO RAIL PAIRS, ROCKERS AND A SEAT SUPPORT

CROSS REFERENCE TO RELATED APPLICATIONS

This application is a continuation of International Application No. PCT/EP2009/060421, filed Aug. 12, 2009. This application also claims priority to German Application No. 10 2008 041 345 filed Aug. 19, 2008. The contents of both of these references are hereby incorporated by reference in their entireties as part of the present invention.

BACKGROUND OF THE INVENTION

The invention relates to a base frame of a motor vehicle seat comprising two rail pairs, two front rockers, two rear rockers and one seat support which has two side parts, a front cross member and a rear cross member, wherein each rail pair is hinged to a side part via a front rocker and a rear rocker and an adjustment device is provided for the height adjustment of the seat support. Such a base frame is known from U.S. Pat. No. 6,502,798 B1.

In the case of base frames for motor vehicle seats, efforts are being made to keep the constructional height low. Furthermore, the room within the base frame is often taken up by different components and drives. This especially applies in the case where the vehicle seat is fully equipped with the maximum of the options offered by the manufacturer for adjusting and using the seat.

A combination of a sector wheel and pinion has gained general acceptance for a height adjustment mechanism of a base frame; in this context, reference is made, only by way of example, to the above-mentioned U.S. Pat. No. 6,502,798 B1; a combination of a toothed rack and locking mechanism is also being used, see, only by way of example, EP 1 190 891 B1. With regard to the prior art, reference is also made to U.S. Pat. No. 3,765,720 A and U.S. Pat. No. 5,622,406 A.

The aim is that, if possible, it is not both seat sides that are provided with components of the adjustment device and actively adjusted, but rather that only a single adjustment device is provided, if possible, which is more or less allocated to one seat side. In this case, the base frame is designed such that the other seat side is passively co-adjusted.

Based thereon, the invention has set itself the object of specifying a height-adjustable base frame for a motor vehicle seat which has a single adjustment device and as few components as possible, with common drive components being used, and which is suitable for a one-sided lock.

SUMMARY OF THE INVENTION

The invention is directed to a base frame of a motor vehicle seat. The base frame comprises two rail pairs; two front rockers; two rear rockers and a seat support. The seat support comprises two side parts, a front cross member and a rear cross member. Each rail pair is hinged to a side part via a front rocker and a rear rocker. An adjustment device is provided for a height adjustment of the seat support, the adjustment device comprises an adjustment part. A transverse part is provided, one of the rockers is connected to the transverse part. A support part is provided, the support part is connected to the transverse part. The transverse part comprises a hinge area for the adjustment part of the adjustment device and further comprises a contact area arranged on the one of the two cross members being adjacent to the transverse part.

In this base frame, the adjustment device is substantially disposed along a diagonal of the quadrilateral linkage. Only one adjustment device is provided which is closer to one seat side than to the other seat side. In this case, a spindle drive as it is well-known from the prior is preferably used as the adjustment device; only by way of example, reference is made to U.S. 2006/0260424 A1.

Other advantages and features of the invention become apparent from the other claims as well as from the following description of an exemplary embodiment of the invention, which shall be understood not to be limiting and which will be explained below with reference to the drawing.

DETAILED DESCRIPTION OF THE PREFERRED EMBODIMENTS

Figure 1:
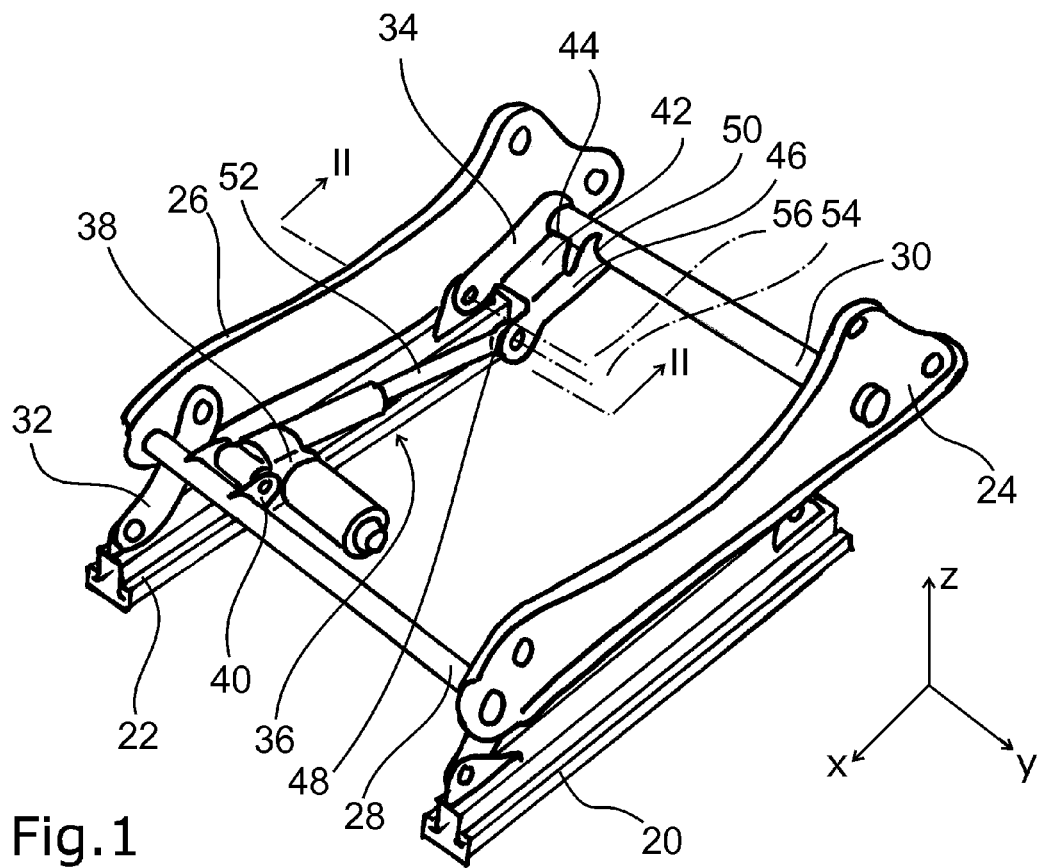
FIG. 1 shows a perspective view, at an angle from above and the front, of a base frame according to the invention.

The base frame according to the embodiment shown is configured as a so-called quadrilateral linkage with parallelogram arms or as a parallelogram kinematic system. Such embodiments are generally known from the prior art. The base frame comprises a left rail pair 20 and a right rail pair 22. A seat support comprises a left side part 24, a right side part 26, a front cross member 28 and a rear cross member 30. These four parts substantially form a frame. It is preferably rigid. The four parts are interconnected. Bores are provided in the rear area of the side parts 24, 26; among other things, they serve for accommodating a backrest hinge with a backrest (not shown).

Each of the rail pair 20, 22 is hinged to the side part 24, 26 above it, at the front via a front rocker 32, and at the rear via a rear rocker 34. The front or the rear rocker pair can also be replaced with an equivalent means, for example a link guide, longitudinal guide or the like. If the cross members 28, 30 are designed as tubes in the embodiment, this should not be understood to be limiting. The cross members can be designed as parts of any shape. Their purpose is to connect the two side parts 24, 26.

An adjustment device 36 is provided; it is configured as a spindle drive. It changes its length upon actuation. It comprises a gear motor 38 which is oriented parallel to the front cross member 28 and located in its immediate vicinity. In any case, its distance from the front cross member 28 is five (5) to 30% of the distance of the cross member 28, 30 from each other. The gear motor 38 is hinge-linked to the front cross member 28 via a bearing block 40. To this end, two bearing eyes are attached to this cross member 28. They protrude towards the rear in the x-direction. The gear motor 38 turns a spindle nut (not shown) in the known manner. It is in engagement with a spindle 52. The spindle 52 is extended or retracted upon actuation of the gear motor 38. It does not turn in the process.

Seen in the y-direction, an upper hinge point of the two front rockers 32 is located behind the front cross member 28, approximately at the level of the bearing block 40 or the gear motor 38. It is located in the plane defined by the cross members 28, 30.

Whereas the other three rockers 32, 34 are formed in accordance with the prior art, the right rear rocker 34 is developed further in accordance with the invention. It is connected to a transverse part 42. It is located in a plane defined by the longitudinal direction of this rocker 34 and the rear cross member 30. The transverse part 42 is connected in a weld seam 44 to this rear cross member 30, hereinafter referred to as adjacent cross member or the one of the two cross members being adjacent to the transverse part 42, and can extend at a right angle to the rocker 34 with a deviation of ± 15°. Other attachment options are possible. An attachment can also be dispensed with; however, a contact is provided. Any other of the remaining rockers can alternatively be connected to the transverse part 42. The other cross member 28 is named the one of the two cross members being remote from the transverse part 42.

Figure 2:
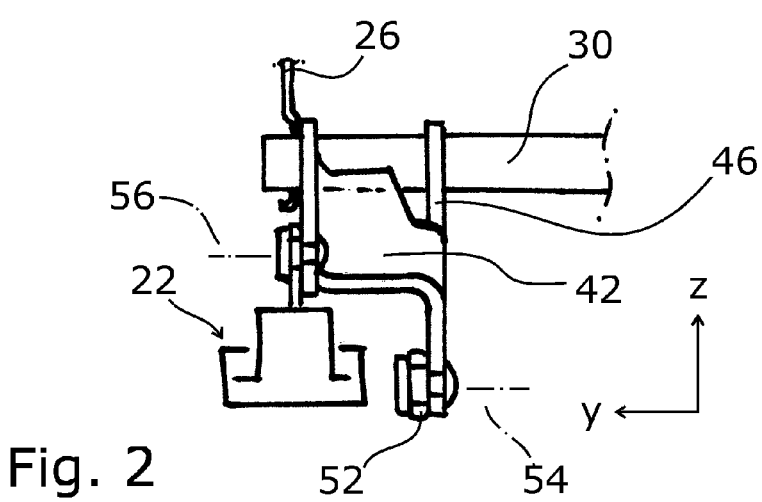
FIG. 2 shows a sectional view along a sectional plane II-II parallel to the y-z-plane.

The transverse part 42 extends over a length, seen in the longitudinal direction of the associated rocker 34, of about 40%-90% and in some embodiments about 60% of the hinge distance of this rocker 34. The transverse part 42 has a width extending in the y-direction, ranging from about 20-200% and in some embodiments about half (50%) of the length. The transverse part 42 protrudes towards the inside from the underside of the rocker 34. A support part 46 is provided at its free end that can be substantially parallel to the rocker 34 with a deviation of ± 20°. It is directed in the downward direction. Therefore, seen in the x-direction, the unit comprised of rocker 34, transverse part 42 and the support part 46 is almost Z-shaped. FIG. 2 shows this. The support part 46 is shaped similar to the actual rocker 34. It has a hinge area 48 pointing forward in the x-direction and a contact area 50 in the opposite direction, with which it is supported on the adjacent cross member 30, preferably connected with a weld seam 44 or the like.

The hinge area 48 is hinged to the end of a spindle 52. The axis is referred to as hinge area axis 54. The rocker 34 is hinged, in a bearing part, to the seat rail of the right rail pair 22; this is done about a lower rocker axis 56. The two axes 54, 56 are parallel to each other; they are also parallel to the cross members 28, 30. The two axes preferably lie in a plane that is parallel to the y-z-plane. Preferably, they have a distance from each other which may be between 0 and 50 mm.

Preferably, the unit comprised of a rocker 34, transverse part 42 and support part 46 is produced to be integral, this means they are made in one single part. It can be obtained from a sheet-metal blank; this is shown in the embodiment. In the process, a sheet-metal blank is bent in different directions at the two longitudinal boundaries of the transverse part 42, as is apparent from FIG. 2. At the contact area 50, the transverse part 42 has a cut-out; the material of this cut-out is found in an upper tab of the support part 46; the support over a larger bottom on the cross member 30 is thus effected.

The hinge point of the spindle 52 and the hinge area 48 has a distance from the right side part 26 which is significantly smaller than the distance from the left side part. The ratio is about 1:4. It can be in the range of 5 to 40%, preferably 8-25%.

We claim:

1. A base frame of a motor vehicle seat, the base frame comprising:
   two rail pairs;
   two front rockers;
   two rear rockers; and
   a seat support, the seat support comprising two side parts, a front cross member and a rear cross member; wherein the two side parts, the front cross member and the rear cross member are interconnected and form a frame, each rail pair is hinged to a side part via one of the two front rockers and one of the two rear rockers, an adjustment device is provided for a height adjustment of the seat support, the adjustment device comprising an adjustment part; and wherein a transverse part is provided adjacent to one of the front cross member and the rear cross member, and one of the rockers is connected to the transverse part;
   wherein a support part is provided, the support part being connected to the transverse part and wherein the transverse part comprises a hinge area for the adjustment part of the adjustment device and further comprises a contact area arranged on the one of the front cross member and the rear cross member adjacent to the transverse part.

2. The base frame of a motor vehicle seat of claim 1, wherein the adjustment device is disposed between the hinge area and one of the two cross members that is remote from the transverse part and that is not said one of the two cross members that is adjacent to the transverse part.

3. The base frame of a motor vehicle seat of claim 1, wherein the support part is disposed substantially parallel to the one of the rockers the transverse part is connected to with a deviation of ±20°.

4. The base frame of a motor vehicle seat of claim 1, wherein the one of the rockers connected to the transverse part, the transverse part and the support part are made in one part.

5. The base frame of a motor vehicle seat of claim 1, wherein the one of the rockers connected to the transverse part, the transverse part and the support part are produced from a sheet-metal blank.

6. The base frame of a motor vehicle seat of claim 1, wherein the support part is connected to the one of the two cross members being adjacent to the transverse part at the transverse part.

7. The base frame of a motor vehicle seat of claim 1, wherein the one of the rockers the transverse part is connected to comprises hinge points of the rocker, and the transverse part extends over a length that is 40-90% of the distance between the hinge points of the one of the rockers.

8. The base frame of a motor vehicle seat of claim 1, wherein the transverse part has a width that is 20-200% of a longitudinal dimension of the transverse part.

9. The base frame of a motor vehicle seat of claim 1, wherein the transverse part extends at a right angle with a deviation of ±15° to the associated rocker and/or to the support part.

10. The base frame of a motor vehicle seat of claim 1, wherein the adjustment device comprises a gear motor retained in a bearing block in the vicinity of one of the two cross members that is remote from the transverse part and that is not said one of the two cross members that is adjacent to the transverse part.

11. The base frame of a motor vehicle seat of claim 1, wherein the hinge area comprises a hinge area axis, the rocker the transverse part is connected to has a lower rocker axis and the hinge area axis and the lower rocker axis extend parallel to each other.

12. The base frame of a motor vehicle seat of claim 11, wherein a distance between the hinge area axis and the lower rocker axis is one of less than 30 mm and less than 15 mm.

13. The base frame of a motor vehicle seat of claim 11, wherein the hinge area axis and the lower rocker axis are coaxial.

14. The base frame of a motor vehicle seat of claim 1, wherein the one of the rockers connected to the transverse part, the transverse part and the support part is a deformed sheet-metal blank.

15. The base frame of a motor vehicle seat of claim 1, wherein a quadrilateral linkage is formed by one of the two rail pairs, one of the two side parts, one of the two front rockers and one of the two rear rockers, and the adjustment device is substantially disposed along a diagonal of the quadrilateral linkage.

16. The base frame of a motor vehicle seat of claim 1, wherein the frame comprises a rigid frame.

17. A base frame of a motor vehicle seat, the base frame comprising:
- two rail pairs;
- two front rockers;
- two rear rockers; and
- a seat support, the seat support comprising two side parts, a front cross member and a rear cross member; wherein each of the front cross member and the rear cross member connects the two side parts, each rail pair is hinged to a side part via one of the two front rockers and one of the two rear rockers, an adjustment device is provided for a height adjustment of the seat support, the adjustment device comprising an adjustment part; and wherein a transverse part is provided adjacent to one of the front cross member and the rear cross member, and one of the rockers is connected to the transverse part;

wherein a support part is provided, the support part being connected to the transverse part and wherein the transverse part comprises a hinge area for the adjustment part of the adjustment device and further comprises a contact area arranged on the one of the front cross member and the rear cross member adjacent to the transverse part.

* * * * *